US012383942B2

(12) United States Patent
Fontecha Cuetos

(10) Patent No.: US 12,383,942 B2
(45) Date of Patent: Aug. 12, 2025

(54) SYSTEM AND METHOD FOR THE SELECTIVE EXTRACTION OF VISCOUS HYDROCARBONS FROM TANKS AND OTHER CONTAINERS

(71) Applicants: CARRERES Y ASOCIADOS GESTORA EN INMOBILIARIA Y MEDIO AMBIENTE, SL, La Selva del Camp-Tarragona (ES); Evaristo Fontecha Cuetos, Santander (ES)

(72) Inventor: Evaristo Fontecha Cuetos, Santander (ES)

(73) Assignees: CARRERES Y ASOCIADOS GESTORA EN INMOBILIARIA Y MEDIO AMBIENTE, SL, La Selva de Camp-Tarragona (ES); EVARISTO FONTECHA CUETOS, Santander (ES)

( * ) Notice: Subject to any disclaimer, the term of this patent is extended or adjusted under 35 U.S.C. 154(b) by 358 days.

(21) Appl. No.: 18/007,783

(22) PCT Filed: Jun. 2, 2021

(86) PCT No.: PCT/ES2021/070396
§ 371 (c)(1),
(2) Date: Dec. 2, 2022

(87) PCT Pub. No.: WO2021/255304
PCT Pub. Date: Dec. 23, 2021

(65) Prior Publication Data
US 2023/0234111 A1    Jul. 27, 2023

(30) Foreign Application Priority Data
Jun. 3, 2020 (ES) ................................ ES202030521

(51) Int. Cl.
B08B 9/093  (2006.01)
B01D 17/04  (2006.01)
(Continued)

(52) U.S. Cl.
CPC .......... *B08B 9/0933* (2013.01); *B01D 17/042* (2013.01); *B08B 9/035* (2013.01);
(Continued)

(58) Field of Classification Search
None
See application file for complete search history.

(56) References Cited

U.S. PATENT DOCUMENTS 5,041,165 A    8/1991    Urbani

FOREIGN PATENT DOCUMENTS

WO    WO 2012/094562 A1    7/2012
WO    WO 2017/118766 A1    7/2017
WO    WO 2019/197690 A1    10/2019

*Primary Examiner* — Rita P Adhlakha
(74) *Attorney, Agent, or Firm* — Robert Joseph Hess; Hess Patent Law Firm

(57) ABSTRACT

The invention proposes a system and a method for the selective extraction of viscous hydrocarbons from tanks and other containers. The system comprises the following components for heating the hydrocarbons: a steam ejector -3-, in which there takes place an eddy diffusion of its drive steam with the gases it aspirates by means of the Venturi effect, and a perimetric heating conduit -5- externally attached to the tank or container. The method comprises the following operations: heating a surface layer of hydrocarbons by means of the gases injected by the steam ejector, causing a selective flow of hot hydrocarbons to the perimetric conduit; localized heating of the hydrocarbons with the perimetric conduit, causing the precipitation of water and a selective flow of the hottest hydrocarbons to an extraction pump; and extracting the precipitated water and the hydrocarbons flow- (Continued)

ing selectively from the perimetric conduit by means of two pumps.

12 Claims, 1 Drawing Sheet

(51) Int. Cl.
 *B08B 9/035* (2006.01)
 *B08B 13/00* (2006.01)
(52) U.S. Cl.
 CPC ...... *B08B 13/00* (2013.01); *B08B 2203/0229* (2013.01); *B08B 2209/08* (2013.01); *B08B 2230/01* (2013.01)

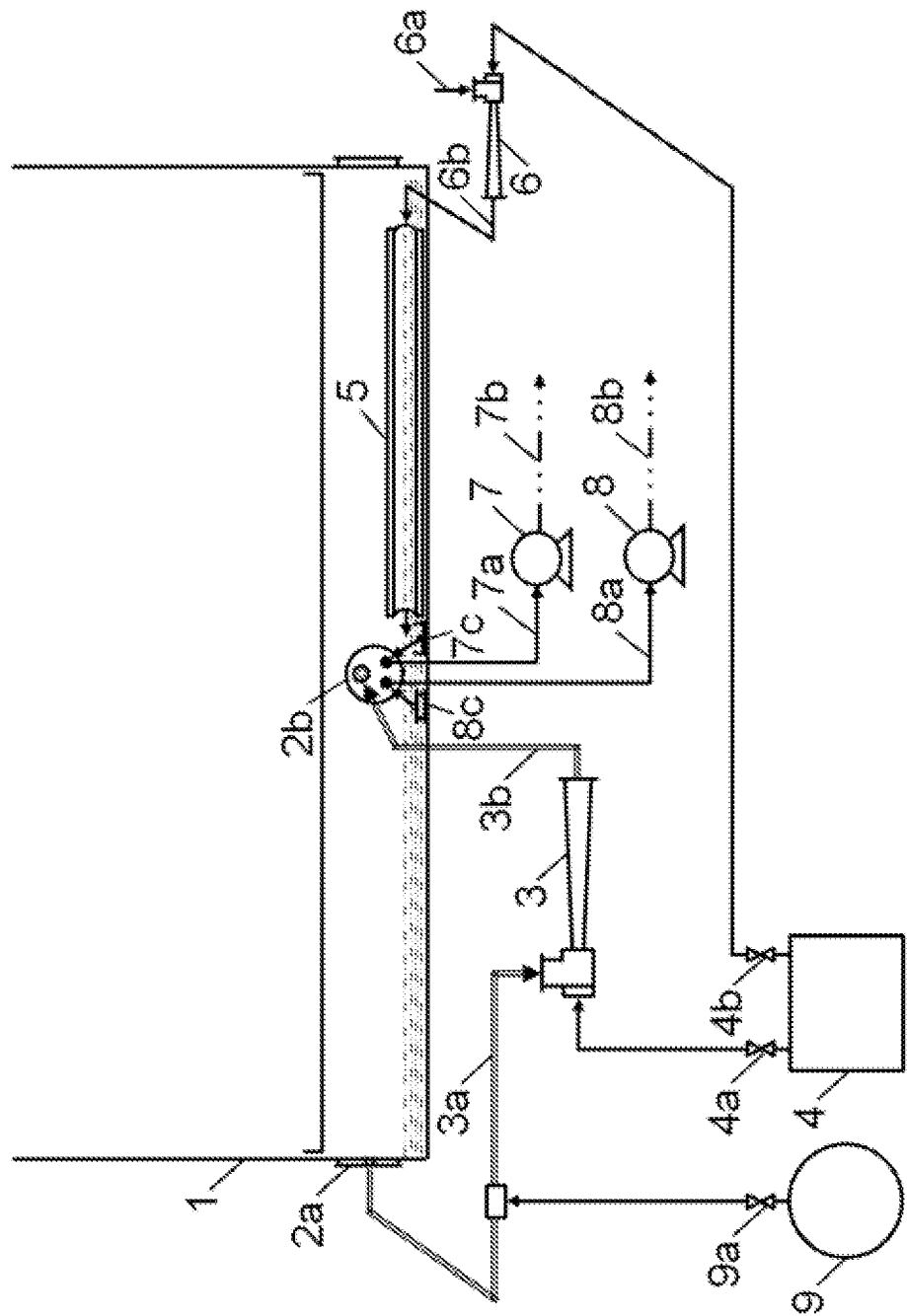

SYSTEM AND METHOD FOR THE SELECTIVE EXTRACTION OF VISCOUS HYDROCARBONS FROM TANKS AND OTHER CONTAINERS

TECHNICAL FIELD

The present invention relates to a system and a method for the selective extraction of viscous hydrocarbons from storage tanks and other containers, which must be emptied and cleaned on a regular basis to perform periodic inspections, repairs, load changes, demolitions, etc.

The system and the method object of the invention are applicable to storage tanks and other containers which contain viscous hydrocarbons existing in oil refineries, petrochemical plants, thermal power stations, port terminals, etc. Floating-roof oil tanks and hydrocarbon process units, including distillation towers, reactors, fan coolers, containers with gaseous hydrocarbon "demisters", interconnection pipes, etc., constitute representative examples of applications of the invention.

Among the viscous hydrocarbons to which the system and the method for selective extraction are applicable, hydrocarbons accumulating at the bottom of oil tanks (in class B, flash point <55° C.), fuel oil (in class C, flash point comprised between 55° C. and 100° C.), and asphalts (in class D, flash point >100° C.), must be pointed out.

BACKGROUND OF THE INVENTION

U.S. Pat. No. 3,874,399A discloses a method for the evacuation of high-viscosity hydrocarbons from a tank by means of recirculating pre-heated evacuated hydrocarbons in the tank for the purpose of reducing the viscosity of the contents in the tank and facilitating the evacuation thereof.

ES417373A1 describes a method of purging flammable waste from a container comprising passing a gas stream containing water vapor and an inert gas, such as nitrogen, through the container, wherein the gas stream introduced into the container has a water vapor content in the range between 4 and 50% by volume and introduces enough heat into the container to reach a temperature of at least 50° C.

U.S. Pat. No. 5,085,242A discloses a method and apparatus for the removal of residues from storage tanks by means of localized heating of the tank with steam, water, or electrical energy, causing the hydrocarbons to flow into the heating area.

GB2101475A describes a method for cleaning storage tanks by means of heating the sludge by contacting it with hot water (injection and recirculation of hot water), thus reaching a temperature of 70° C. which allows the extraction of the residue as a result of its reduced viscosity.

ES2391183B1 (P201100464), belonging to the same inventor as the present application, discloses a method for the selective extraction of high-viscosity hydrocarbons using the following steps: applying hazard prevention measures (for floating-roof oil tanks a measurement of the explosiveness inside the tank is taken), heating the contents of the tank by means of flexible coils slightly submerged in the hydrocarbons, and heating the surface layer of hydrocarbons by means of injecting hot air into the tank.

ES2544575B1 (P201400060), likewise belonging to the same inventor as the present application, discloses a method for the selective extraction of remnant viscous hydrocarbons in storage tanks. It comprises the following operations: measuring the explosiveness inside the tank, heating the hydrocarbons by means of devices located inside the tank, and heating the surface layer of hydrocarbons by means of injecting hot air. As a further step, after the extraction of hydrocarbons and maintaining the injection of hot air, hot water is injected over the remnant hydrocarbons to facilitate their subsequent extraction.

Patent document WO2017118766A1 (P201600007), also belonging to the same inventor as the present application, discloses a method for the extraction of viscous hydrocarbons in tanks by means of the injection, into the tank, of a stream consisting of hot air and water vapor. A centrifugal fan or gas circulator which passes the stream through an electric heater with deflectors causing an eddy flow is used for injection. By doing this, the air is heated, the moisture is absorbed by the air, and the water vapor is superheated, the extraction of the hydrocarbons then taking place. Furthermore, by means of devices for localized heating in the vicinity of the suction lines, further heating of the hydrocarbons can be performed.

Patent document WO2019197690 (P201800095), belonging to the same inventor as this application, describes a method for the extraction of viscous hydrocarbons from storage tanks and process equipment, which proposes injecting into the tank or piece of equipment an inert gas until achieving an oxygen concentration that ensures a range of zero flammability, and then injecting into the tank or piece of equipment a gas stream homogenized by means of an irreversible eddy diffusion process, with the stream consisting of gases recirculated from the tank or piece of equipment itself and the amounts of water vapor and inert gas required at all times to keep the oxygen concentration at values which ensure a range of zero flammability and to cause the hydrocarbons to flow in an amount equivalent to that demanded by an extraction pump suitable for use in potentially explosive atmospheres.

Utility model RU 25176U discloses a device for cleaning viscous oil and sediments or deposits of petroleum products from tanks, said device contains means for heating, liquefying, moving, and mixing said deposits, including ejection means comprising a hollow bar through which water vapor, gas, or liquid circulates, said hollow bar being located above the bottom of the deposit, and ejector heads for carrying said water vapor, gas, or liquid to the surface of the tank.

The method of the present invention differs from the mentioned prior art methods in that it uses a combination of a steam ejector and a perimetric heating conduit attached to the outer wall of the tank, which allow the hydrocarbons of the surface layer and, in a localized manner, the hydrocarbons adjacent to the entire extension of the perimetric conduit to be heated, for the purpose of causing, with this double heating, the precipitation of non-emulsified water, so that it can be extracted separately from the hydrocarbons, and the establishment of two selective flows of hydrocarbons, that is, one from the surface layer to the area heated by the entire extension of the perimetric conduit and the second one from said area heated by the perimetric conduit to a suction device of a pump which selectively extracts the hydrocarbons.

The two components characterizing the method object of the present invention, i.e., the steam ejector and the perimetric heating conduit, are not used in any of the prior art methods and provide results that are not obtained with any of them or with the combinations thereof, since they are unable to generate two selective flows of hydrocarbons coming from the surface layer, nor can they generate the precipitation and separate extraction of the non-emulsified water.

Therefore, the method of the present invention achieves an extraction that is more selective than that which is achieved with any of the prior art methods or the combination thereof. The extraction of the hydrocarbons is referred to as "selective" because it meets two conditions: the hydrocarbons are extracted separately from the non-emulsified water, and the mixture of the hydrocarbons from the surface layer with the hydrocarbons closest to the bottom of the tank or container, with the latter being the ones that are usually emulsified with water or contaminated by sludge and sediments, is prevented during extraction.

In the case of prior art methods which are based on the generalized heating of hydrocarbons in the tank, such as the method in U.S. Pat. No. 3,874,399A, the extraction that is performed is not selective as a generalized reduction in viscosity of the hydrocarbons and, accordingly, an undesired flow of contaminated hydrocarbons from the bottom of the tank to the suction duct of the pump, takes place.

Regarding the prior art methods based on the localized heating of hydrocarbons in the tank, such as in U.S. Pat. No. 5,085,242A, they are much less effective because the flow of hydrocarbons to the heating area is very slow or inexistent, in addition to an undesired flow of the most contaminated hydrocarbons from the bottom of the tank to the heating area takes place, so the extraction is no longer selective.

In the case of the prior art methods which establish a heating by means of injecting water vapor, as in ES417373A1, or which establish the recirculation of hot water, as in GB2101475A, the extraction is not in any case selective, because an undesired flow of the most contaminated hydrocarbons from the bottom of the tank to the extraction area takes place, and the hydrocarbons with the condensates of the injected water vapor or with the recirculated hot water are contaminated with water.

When the method is applied to fuel oil tanks, preventing both the contamination with water and the undesired flow of contaminated hydrocarbons from the bottom of the tank is fundamental for being able to sell the extracted fuel oil in compliance with legal specifications concerning the water and sediment content, because a small flow of contaminated fuel oil from the bottom of the tank to the suction duct of the pump is usually sufficient for not being compliant with said legal specifications and for all of the extracted fuel oil to have to be managed as a waste.

Regarding the other four prior art methods referred to above (ES2391183B1, ES2544575B1, WO2017118766A1, and WO2019197690), all four correspond to the same inventor as the present application. In the last two (WO2017118766A1 and WO2019197690), the surface layer of hydrocarbons is heated with water vapor, which is very effective due to the high heat transfer capacity of water vapor, but the extraction is not selective because the hydrocarbons are contaminated with the condensates of the water vapor injected into the tank or container. For that reason, neither the title nor the specifications describing the methods of WO2017118766A1 and WO2019197690 mentions that the extraction of hydrocarbons is selective. In contrast, the term "selective" does appear in the title and in the specification of the present invention, as occurs in the first and second prior art methods (ES2391183B1 and ES2544575B1), these latter two methods establishing the injection of hot air for heating the surface layer of hydrocarbons, so the contaminating effect of the water vapor does not take place, but they do present the drawbacks of having a much lower capacity of heating the surface layer of hydrocarbons and much higher costs invested in equipment and in the execution of the method.

In relation to the mentioned costs, the equipment characterizing the system of the present invention is very simple and only requires the supply of water vapor for operation. This advantage becomes even more evident when taking into account that water vapor is commonly freely available in viscous hydrocarbon storage facilities. In contrast, the four prior art methods belonging to the same inventor referred to above require the use of a considerable number of pieces of electrical equipment: ATEX electric heaters, centrifugal fans, gas circulators, high-powered generator sets, variable frequency drives, electrical cabinets, etc. In contrast, the steam ejector and the perimetric conduit are very low-cost pieces of equipment that do not require maintenance as they do not have mechanical or electrical components; furthermore, the steam ejector alone performs multiple functions: it aspirates gases from a point of the tank or container by means of the Venturi effect, it subjects the aspirated gases to an eddy diffusion process with its drive steam, and it injects the resulting homogeneous mixture of hot gases into another point of the same tank or container.

In addition to performing the selective extraction with a much higher heating capacity and at a much lower cost than the only two prior art methods which enable doing this (ES2391183B1 and ES2544575B1), the method of the present invention allows a more effective selective extraction to be performed. The considerable reduction in viscosity the hydrocarbons experience with the double heating (heating the surface layer with the drive steam of the ejector and localized heating of the hydrocarbons adjacent to the entire extension of the perimetric conduit) prevents the undesired flow of the most contaminated hydrocarbons and closest to the bottom of the tank to the pump, which remain in a viscous and virtually static state as they are not subjected to heating. In contrast, by using any of the two mentioned prior art methods, the hydrocarbons flow more viscously to the suction device of the pump, and the undesired flow of hydrocarbons from the bottom of the tank to the suction device of the pump does take place to a certain extent, particularly as the level of hydrocarbons in the tank drops and during certain times of year (winter in the northern hemisphere) when the hydrocarbons closest to the bottom of the tank have a higher temperature than those on the surface.

Moreover, it should be mentioned that the methods most commonly used in refineries for extracting viscous hydrocarbons from oil tanks are based on dilution with crude oil or low-viscosity hydrocarbons supplied by the refineries themselves. The method of the present invention presents significant advantages over said methods as it allows hydrocarbons to be extracted without mixing them with the contaminants from the bottom of the tanks, allows hazardous leaking inherent to said methods in tanks with unsealed bottoms to be avoided, and allows the layer of hydrocarbons contaminating the walls and the inner face of the floating roof of the tank to detach as an added cleaning effect. Furthermore, applying the method object of the invention requires the use of much simpler equipment which greatly reduces equipment investment costs and execution costs. Regarding other containers, the most widespread methods are cleaning with pressurized water and chemical cleaning, in respect of which the present method has the advantages of being more effective and of generating less waste.

Disclosure of the Invention

The present invention relates to a system and a method for the selective extraction of viscous hydrocarbons from storage tanks and other containers. The extraction of the hydrocarbons is referred to as "selective" because it meets two conditions: the hydrocarbons are extracted separately from the non-emulsified water, and the mixture of the hydrocarbons from the surface layer with the hydrocarbons closest to the bottom of the tank or container, with the latter being the ones that are usually emulsified with water or contaminated by sludge and sediments, is prevented during extraction.

The system for the selective extraction of viscous hydrocarbons from a storage tank or a container is characterized in that, according to a first embodiment, it comprises the combination of the following components:

- a steam boiler having control means configured for regulating the amount and the temperature of the water vapor it supplies, the temperature being comprised between 120 and 200° C. (between about 2 and 15 bar);
- at least one steam ejector intended for heating a surface layer of the hydrocarbons to be extracted, with its drive steam nozzle connected to said boiler, such that there takes place in the diffuser of the steam ejector an eddy diffusion of the drive steam provided by the boiler with the gases aspirated by the ejector through its aspiration opening by means of the Venturi effect, which gases come from the tank or container itself, from the atmosphere, from the steam boiler (water vapor for increasing the temperature of the gases discharged by the ejector), or from a combination of said origins, there being obtained as a result at the discharge opening of the ejector a homogeneous mixture of hot gases which the steam ejector itself injects into the tank or container through a gas discharge duct for heating the surface layer of hydrocarbons; and
- at least one pump intended for selectively extracting the hydrocarbons from the surface layer heated by the homogeneous mixture of hot gases injected by the mentioned steam ejector, with a suction duct of said pump being connected to the tank or container in a peripheral area to which the hydrocarbons from the surface layer heated with the gases injected by the steam ejector flow.

In the event that the boiler provides water vapor to the gas aspiration duct of the ejector for increasing the temperature of the gases which are injected into the tank or container, said water vapor must be depressurized so as not to compromise the proper operation of the ejector and not to cause hazards due to overpressures. Hazards due to overpressures can be eliminated using a pressure reducer valve at the outlet of the boiler, a duct with a diameter that is sufficient for the expansion of the water vapor to occur, or by means of a second steam ejector with its gas discharge opening connected to the gas aspiration opening of the ejector which injects the gases into the tank or container.

Regarding the system, it should be mentioned that the homogeneous mixture of gases resulting from eddy diffusion prevents the free upward movement of the water vapor injected into the tank or container, so a large part of the injected drive steam condenses on the surface layer of hydrocarbons and large amounts of latent heat (539.4 cal/g at 100° C.) are transferred to it.

According to another embodiment of the invention, the system further comprises:

- at least one perimetric conduit intended for the localized heating of the hydrocarbons, externally attached to a section of the metal wall of the tank or container located below the level determined by the hydrocarbons to be extracted, with part of the perimetric conduit consisting of the actual section of the metal wall of the tank or container to which it is attached, such that the hot gases circulated through the mentioned perimetric conduit are in direct contact with said section of metal wall and heat the adjacent hydrocarbons of the tank or container in a localized manner, with such heat transfer being a function of the area of the metal wall in contact with the hot gases, of the temperature of the gases circulating through the perimetric conduit, and of the thermal conductivity of the metal wall of the tank or container;
- at least a second pump intended for extracting the precipitated water in the tank or container, with suction ducts of said first and second pumps being connected to the tank or container in a peripheral area close to the area heated by the perimetric conduit; and
- gas ducts connected to the gas aspiration and discharge openings of the ejector and to two different points of the periphery of the tank or container located above the level determined by the hydrocarbons to be extracted, with at least one of said connection points of the ducts of the steam ejector being close to the peripheral connection area of the hydrocarbon and precipitated water suction ducts.

In another embodiment, the invention further comprises:

- a first suction device which is connected to an end of the mentioned hydrocarbon suction duct and has its aspiration opening oriented upwards, and a second suction device which is connected to the precipitated water suction duct and has its aspiration opening oriented towards the bottom of the tank or container;
- a perimetric heating conduit consisting of a synthetic fabric covering supported by semicircular arches which are distributed along the entire conduit, such that the perimetric conduit acquires a semi-cylindrical shape with its flat section coinciding with the section of the metal wall of the tank or container to which it is attached and sealed by means of two straps, with said semicircular arches having at their two ends support plates which have welded thereto rings for guiding and holding the two straps going through them, such that when the two straps are tensioned at their ends at two anchoring points, they press and seal against the cylindrical wall of the tank or container the mentioned support plates of all the arches and the upper and lower edges of the synthetic fabric on the entire length of the perimetric conduit (by way of example, a roll of siliconized fabric that withstands temperatures greater than 200° C. and with dimensions of about 50 meters in length and 1 meter in width can be used as a synthetic fabric);
- a steam ejector with its discharge opening connected by means of a gas duct to an inlet opening for hot gases from the mentioned perimetric conduit, with its drive steam nozzle connected to the mentioned boiler, and with its gas aspiration opening aspirating air from the atmosphere by means of the Venturi effect, such that the aspirated air is mixed homogeneously with the drive steam and injected by the ejector itself into the inlet opening for hot gases in the perimetric conduit;
- at least one centrifugal fan or a gas circulator installed in the gas aspiration duct of the steam ejector and configured for increasing the flow rate of gases which are injected into the tank or container;
- at least one steam ejector or a connection point for injecting depressurized water vapor installed in the gas aspiration duct of the steam ejector which injects the gases into the tank or container for increasing the temperature of the gases which are injected into the tank or container; and a nitrogen cistern connected to the gas aspiration duct of the steam ejector which injects the gases into the tank or container to prevent fire or explosion hazards in the case of hydrocarbons the flash point of which is less than 55° C. (class B), having control means configured for regulating the amount of nitrogen provided to the tank or container.

The invention is also applicable to the selective extraction of viscous hydrocarbons and other substances, where asphaltic emulsions, oily emulsions, oily sludge, and soot can be mentioned by way of non-limiting example, in which since the mentioned hydrocarbons and substances are subjected to conditions of gas circulation and heating, they are susceptible to flow to a peripheral area of the tank or container in which the ducts of at least one extraction pump are connected.

In turn, the method for the selective extraction of viscous hydrocarbons from storage tanks and other containers object of the present invention is characterized by the following operations:

heating a surface layer of the hydrocarbons to be extracted by means of a steam ejector connected to a boiler supplying water vapor at a temperature comprised between 120 and 200° C., such that said ejector aspirates gases from a point of the tank or container by means of the Venturi effect, subjects the aspirated gases to eddy diffusion with its drive steam, and injects the resulting homogeneous mixture of hot gases into another point of the same tank or container, with the gas aspiration and discharge points of the ejector being above the level determined by the hydrocarbons to be extracted, and regulating the amount of vapor that is provided to the ejector such that during extraction there is established a selective flow of hot hydrocarbons from the surface layer to an area of localized heating of the hydrocarbons in an amount equivalent to what is aspirated by a pump which selectively extracts the hydrocarbons;

localized heating of the hydrocarbons flowing from the surface layer by means of a perimetric conduit externally attached to the tank or container through which hot gases are circulated, such that during extraction precipitation of the non-emulsified water takes place and there is established a selective flow of hydrocarbons heated by the perimetric conduit towards a suction device which is connected by means of a duct to a pump intended for the selective extraction of hydrocarbons; and selective extraction of hydrocarbons heated by the perimetric conduit with a first pump and periodic extraction of precipitated water with a second pump, wherein the duct for the extraction of hydrocarbons has connected at one end a suction device with its aspiration opening oriented upwards and the duct for the extraction of precipitated water has connected at one end a suction device with its aspiration opening oriented towards the bottom of the tank or container, with the hydrocarbon suction device being immersed in the hydrocarbons heated by the mentioned perimetric conduit, and with the water suction device being positioned at the bottom of the tank, with its aspiration opening slightly separated from the bottom.

Once the provision of heat is no longer effective and the flow of hydrocarbons to the suction device of the pump ends, the extraction is concluded and the inside of the tank or container is inspected. If significant amounts of hydrocarbons remain in some area of the tank or container, extraction would continue, appropriately choosing the installation points for the mentioned equipment defining the system of this invention. At the end of the extraction of hydrocarbons, there remain at the bottom of the tank or container water, oily sediments, or hydrocarbons with a high melting point, and they are removed by conventional methods. In contrast, it should be highlighted that when the method is applied, the layer of hydrocarbons initially adhered to the walls and to the inner face of the roof of the tank is removed, being detached by the circulation of hot gases inside the tank or container and particularly by the heating and entrainment of the water vapor when it condenses on the layer of hydrocarbons.

Regarding the method, it should be mentioned that the homogeneous mixture of gases caused by eddy diffusion in the diffuser of the steam ejector prevents the free upward movement of the water vapor injected into the tank or container, so a large part of the injected drive steam condenses on the surface layer of hydrocarbons and large amounts of latent heat (539.4 cal/g at 100° C.) are transferred to it.

In another embodiment of the invention, the hot gases circulated through the perimetric heating conduit are provided by a steam ejector with its gas discharge opening connected to an inlet opening for hot gases in the perimetric conduit, with its drive steam nozzle connected to the mentioned boiler and with its gas aspiration opening aspirating air from the atmosphere by means of the Venturi effect, such that the aspirated air is mixed homogeneously with the drive steam and injected by the ejector itself into said inlet opening for gases in the perimetric conduit.

In the event that the tank or container contains viscous hydrocarbons the flash point of which is less than 55° C. (class B), the following operations are further included:

initial injection of nitrogen into the tank or container until achieving oxygen concentrations below 8%, and regulated provision of an amount of nitrogen in the mentioned aspiration duct of the steam ejector in order to keep the oxygen concentration in the tank or container below 8% at all times. The injection of water vapor into the tank or container also contributes to keeping the oxidizing oxygen concentration below 8% (the oxygen that is a constituent of the water vapor is not an oxidizing agent).

As previously indicated, when the system and the method are applied to the selective extraction of class B viscous hydrocarbons (flash point <55° C.), such as those that accumulate at the bottom of oil tanks, nitrogen must be injected into the tanks or containers in order to keep the oxygen concentration therein below 8% at all times, whereas in the case of class C and D viscous hydrocarbons (flash point 55° C.), such as fuel oil and asphalts, the injection of nitrogen into the tank or container is not necessary as there is no fire and explosion hazard by applying the system and the method object of the invention.

The system and the method object of the invention are applicable to storage tanks and other containers which contain viscous hydrocarbons existing in oil refineries, petrochemical plants, thermal power stations, port terminals, etc. Regarding the manner of applying the invention to other containers, it is virtually the same as in storage tanks, with the exception of having to adapt in each case the installation of the equipment to multiple configurations and sizes. Examples of these latter applications include process units of refineries and petrochemical plants, including distillation towers, reactors, fan coolers, containers with gaseous hydrocarbon "demisters", interconnection pipes, etc. Both the system and the method can be applied to complete process units or separately to components thereof, appropriately choosing in both cases the gas aspiration and discharge points of one or more steam ejectors and the areas of localized heating of the hydrocarbons, and injecting nitrogen as a fire and explosion hazard prevention measure.

BRIEF DESCRIPTION OF THE DRAWINGS

FIG. 1 shows a floating-roof oil tank -1- the manholes of which are installed with covers -2a- and -2b- which have connection fittings required for installing the system and applying the method. A steam ejector -3- aspirates gases from a given point of the tank through a gas aspiration duct -3a- connected to the cover -2a- by means of the Venturi effect, and using a gas discharge duct -3b- connected to the cover -2b-, injects the gases once they are hot and mixed homogeneously with the drive steam supplied by a steam boiler -4- at a temperature comprised between 120 and 200° C., the boiler having a valve -4a- for regulating the amount of water vapor it supplies to the ejector.

Moreover, a perimetric conduit -5- is installed, attached to the outer metal wall of the tank, for heating the oil adjacent to the entire extension of the perimetric conduit. In one embodiment of the invention, the perimetric conduit is connected to a second steam ejector -6-, which aspirates air from the atmosphere -6a- by means of the Venturi effect and discharges it into the perimetric conduit, through the gas discharge duct -6b-, mixed homogeneously with the drive steam supplied by the steam boiler -4-, having a regulation valve -4b-.

A pump -7- selectively extracts the oil heated by the perimetric conduit through a suction duct -7a-, and a second pump -8- extracts the precipitated water through a suction duct -8a-. The extracted oil and water are pumped separately, through oil and water delivery ducts -7b- and -8b-, to determined storage, transport, or treatment points. The mentioned suction ducts of the pumps have connected at their respective ends an oil suction device -7c- and a precipitated water suction device -8c-, which devices are positioned inside the tank next to the area heated by the perimetric conduit and are designed such that the oil suction device has its aspiration opening oriented upwards and the water suction device has its aspiration opening oriented towards the bottom of the tank and slightly separated therefrom.

Given that the hydrocarbons that accumulate at the bottom of oil tanks are in class B (flash point <55° C.), to eliminate fire and explosion hazards there has been provided a nitrogen cistern -9- which, by means of a control valve -9a-, provides a regulated amount of nitrogen to the gas aspiration duct of the ejector -3a-. In this way, the flow of homogenized hot gases that are injected into the tank therefore have a high nitrogen concentration which contributes to keeping the oxygen concentration inside the tank below 8% at all times. Likewise, the injection of drive steam from the ejector also contributes to keeping the oxidizing oxygen concentration in the tank below 8% (oxygen that is a constituent of the water vapor is not an oxidizing agent).

DETAILED DESCRIPTION OF A PREFERRED APPLICATION OF THE INVENTION

A preferred application of the method is represented by the extraction of viscous hydrocarbons that accumulate at the bottom of floating-roof oil tanks (class B hydrocarbons, with a flash point <55° C.).

The sequence of operations of the method is the following:

initial injection of nitrogen into the tank until achieving an oxygen concentration below 8%. Subsequently, during extraction of the oil, a nitrogen cistern -9-, provided with a control valve -9a-, provides a regulated amount of nitrogen, such that the oxygen concentration inside the tank is kept below 8% at all times;

heating of a surface layer of oil by means of a steam ejector -3- which aspirates gases from a point of the tank itself above the level of the oil to be extracted and returns it, homogeneously mixed with its drive steam and the amount of nitrogen required for keeping the oxygen concentration below 8%. The amount of drive steam provided to the ejector is regulated such that an amount of oil from the surface layer that is sufficient for not slowing down the selective extraction of the oil flows selectively to an area adjacent to a perimetric heating conduit -5-;

localized heating of the oil with the mentioned perimetric conduit externally attached to the tank, such that when the viscosity of the adjacent hydrocarbons is reduced with the heating, precipitation of the non-emulsified water takes place and a selective flow of the oil heated by the perimetric conduit to a suction device -7c- connected to an oil extraction pump -7- is established. The injection of hot gases into the perimetric conduit is performed using a second steam ejector -6- which aspirates air from the atmosphere by means of the Venturi effect and injects it into the perimetric conduit mixed homogeneously with its drive steam, which water vapor is supplied by the mentioned steam boiler -4-, regulating said supply by means of the valve -4b-; and selective extraction of the oil heated by the perimetric conduit and separate extraction of precipitated water with two pumps -7- and -8-, the respective suction devices -7c- and -8c- of which are positioned inside the tank next to the area heated by the perimetric conduit. The pumps thereby allow the oil and the water to be transferred separately to the points designated for storage, transport, or treatment.

Once the provision of heat is no longer effective and the flow of oil to the oil suction device -7c- ends, the extraction is concluded and the inside of the tank is inspected. If significant amounts of oil remain in some area of the tank, extraction would continue, appropriately choosing the positioning points for the equipment. In large tanks, there can be several positioning for the equipment or two or more steam ejectors with their corresponding perimetric heating conduits and extraction pumps can be used simultaneously. At the end of the extraction of oil, water, oily sediments or hydrocarbons with a high melting point always remain at the bottom of the tank, and they are removed by conventional methods. In contrast, it should be highlighted that when the method is applied, the layer of oil initially adhered to the walls and to the inner face of the roof of the tank is removed, being detached by the circulation of hot gases inside the tank and particularly by the heating and entrainment of the water vapor when it condenses on the layer of the oil.

The invention claimed is:

1. A system for the extraction of viscous hydrocarbons from storage tanks and other containers, comprising:

a steam boiler having a control element configured for regulating amount and temperature of water vapor it supplies, so that the temperature of the supplied water vapor is comprised between 12° and 200° C.;

a device for homogenizing the water vapor supplied by the steam boiler with a gas stream configured for recirculating gases from the steam boiler, and for injecting into a tank or container a resulting homogeneous gas mixture and heating a surface layer of hydrocarbons to be extracted;

at least one pump for selectively extracting the hydrocarbons from the surface layer heated by the injected homogeneous gas mixture, the pump having a suction duct connected to the tank or container in a peripheral area for the extraction therein of the heated hydrocarbons from the surface layer;

wherein said device comprises at least one steam ejector that provides an eddy diffusion of drive steam vapor of supplied by the steam boiler with said recirculated gases from the tank or container, the steam ejector having:
  a drive steam vapor connected to the steam boiler;
  a suction duct connected to a point in the tank or container above the surface layer of the hydrocarbons to be extracted; and
  a gas discharge duct through which the homogeneous gas mixture is injected into the tank or container,
so that within a diffuser of the steam ejector there occurs the eddy diffusion of the drive steam vapor supplied by the steam boiler with the gases that the steam ejector aspirates in by Venturi effect through said suction duct, with gases coming from the tank or container, from the atmosphere, from the steam boiler or from a combination thereof, and in that at a discharge port of the gas discharge duct of the steam ejector the homogeneous mixture of hot gases resulting from said eddy diffusion is injected into the tank or container to heat the surface layer of the hydrocarbons,
whereby such eddy diffusion prevent a free upward movement of the steam injected into the tank or container and as a result, a large part of the injected drive steam vapor supplied condenses on the surface layer of the hydrocarbons and transfers its latent heat to it; further comprising: a perimetric conduit intended for the localized heating of the hydrocarbons, externally attached to a section of a metal wall of the tank or container located below a level determined by the hydrocarbons to be extracted, with part of the perimetric conduit consisting of the actual section of the metal wall of the tank or container to which it is attached, such that the hot gases circulated through the perimetric conduit are in direct contact with said section of the metal wall and heat the adjacent hydrocarbons of the tank or container in a localized manner;
  at least a second pump intended for extracting the precipitated water in the tank or container, with suction ducts and of said first and second pumps being connected to the tank or container in a peripheral area close to the area heated by the perimetric conduit; and
  gas ducts connected to the gas aspiration and discharge openings of the steam ejector and to two different points of the periphery of the tank or container located above the level determined by the hydrocarbons to be extracted, with at least one of said connection points of the ducts of the ejector being close to the peripheral connection area of the hydrocarbons and precipitated water suction ducts.

2. The system according to claim 1, wherein the hydrocarbon suction duct has connected at one end a suction device with its aspiration opening oriented upwards and the precipitated water suction duct has connected at one end a suction device with its aspiration opening oriented towards the bottom of the tank or container.

3. The system according to claim 1, wherein the perimetric heating conduit consists of a synthetic fabric covering supported by semi-circular arches which are distributed along the entire conduit, such that the perimetric conduit acquires a semi-cylindrical shape with its flat section coinciding with the section of the metal wall of the tank or container to which it is attached and sealed by means of two straps, with the semi-circular arches having at their two ends support plates which have welded thereto rings for guiding and holding the two straps going through them.

4. The system according to claim 3, wherein the hot gases circulated through the perimetric conduit are provided by a second steam ejector with its gas discharge opening connected to an inlet opening for hot gases in the perimetric conduit, with its drive steam nozzle connected to the steam boiler, and with its gas aspiration opening aspirating air from the atmosphere by means of the Venturi effect, such that said aspirated air is mixed homogeneously with drive steam vapor supplied and injected by the second steam ejector into the inlet opening for gases in the perimetric conduit.

5. The system according to claim 1, wherein the gas aspiration duct of the steam ejector has installed therein at least one centrifugal fan, or a gas circulator configured for increasing the flow rate of gases which the steam ejector injects into the tank or container.

6. The system according to claim 1, wherein the gas aspiration duct of the steam ejector has installed therein at least another steam ejector or a connection point for injecting depressurized water vapor.

7. The system according to claim 1, configured for treating hydrocarbons the flash point of which is equal to or greater than 55° C., in classes C and D.

8. The system according to claim 1, configured for treating hydrocarbons the flash point of which is less than 55° C., in class B, wherein the gas aspiration duct of the steam ejector which injects the gases into the tank or container is connected to a nitrogen cistern having a control element configured for regulating the amount of nitrogen provided.

9. A method for the selective extraction of viscous hydrocarbons from storage tanks and other containers, particularly from a floating-roof and metal-wall tank or container, the method comprising;
  heating a surface layer of the hydrocarbons to be extracted by means of a steam ejector connected to a steam boiler supplying water vapor at a temperature comprised between 120 and 200° C.,
  aspirating, by the steam ejector through its aspiration opening, gases coming from the tank or container, from the atmosphere, from the steam boiler, or from a combination thereof, by means of Venturi effect,
  subjecting the aspirated gases to eddy diffusion with drive steam vapor supplied by the steam boiler,
  injecting a resulting homogeneous mixture of hot gases into another point of the tank or container, and
  regulating an amount of steam provided to the steam ejector, such that a selective flow of hot hydrocarbons from the surface layer to a duct of a pump intended for the selective extraction of hydrocarbons is established; further comprising the following operations: localized heating of the hydrocarbons flowing selectively from the surface layer by means of a perimetric conduit externally attached to the tank or container through which hot gases are circulated, such that during extraction precipitation of the non-emulsified water takes place and there is established a selective flow of hydrocarbons heated by the perimetric conduit to a suction device which is connected by means of the duct to the pump intended for the selective extraction of hydrocarbons; and selective extraction of hydrocarbons heated by the perimetric conduit with said pump and periodic extraction of precipitated water with a second pump, wherein the duct for the extraction of hydrocarbons has connected at one end of the suction device with its aspiration opening oriented upwards and the duct for the extraction of precipitated water has connected at one end a suction device with its aspiration opening oriented towards the bottom of the tank or container, with the hydrocarbon suction device being immersed in the hydrocarbons heated by the mentioned perimetric conduit, and with the water suction device being positioned at the bottom of the tank or container with its aspiration opening slightly separated from the bottom.

10. The method according to claim 9, wherein the hot gases circulated through the perimetric conduit are provided by a second steam ejector with its gas discharge opening connected to an inlet opening for hot gases in the perimetric conduit, with its drive steam nozzle connected to the mentioned steam boiler and with its gas aspiration opening aspirating air from the atmosphere by means of the Venturi effect, such that the aspirated air is mixed homogeneously with drive steam vapor supplied and injected by the second steam ejector into said inlet opening for gases in the perimetric conduit.

11. The method according to claim 9, applicable to hydrocarbons the flash point of which is equal to or greater than 55° C., in classes C and D.

12. The method according to claim 9, applicable to hydrocarbons the flash point of which is less than 55° C., in class B, wherein the following operations are furthermore included:

initial injection of nitrogen from a cistern into the tank or container until achieving an oxygen concentration below 8%; and regulated provision of nitrogen in order to keep the oxygen concentration in the tank or container below 8% at all times.

* * * * *